J. W. Evans,
Garbage Box.
No. 87,918. Patented Mar. 16, 1869.
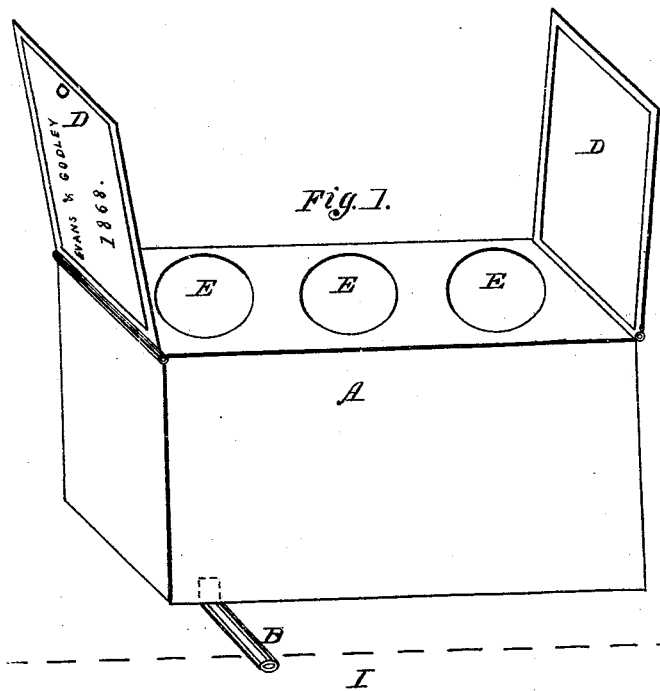
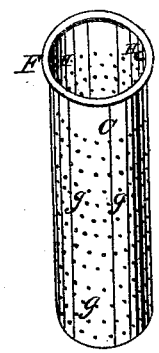
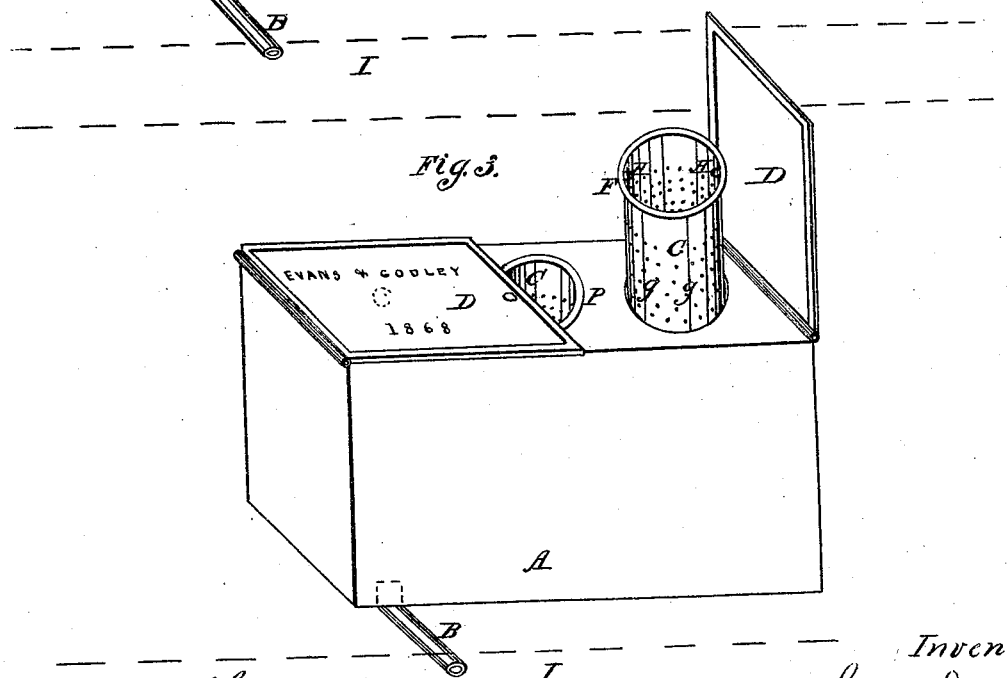
Witnesses:
G. T. Harsin
Robert Wyatt
Inventors,
James W. Evans.
George F. Godley

United States Patent Office.

JAMES W. EVANS AND GEORGE F. GODLEY, OF NEW YORK, N. Y.

Letters Patent No. 87,918, dated March 16, 1869.

IMPROVED GARBAGE-BOX.

The Schedule referred to in these Letters Patent and making part of the same.

*To all whom it may concern:*

Be it known that we, JAMES W. EVANS and GEORGE F. GODLEY, both in the city of New York, county of New York, and State of New York, have jointly invented a new article of manufacture, which we denominate "A Garbage-Box;" and we do hereby declare that the following is a full and exact description thereof, reference being had to the accompanying drawings, and to the letters of reference marked thereon.

The nature of our invention consists in providing a garbage-box, to be inserted in the ground, level therewith, and to be placed opposite to or near tenement or other houses, said box to be made of wood or metal, or other material, and to contain one or more portable vessels, or receptacles, for the purpose of receiving the garbage to be deposited therein from said tenement or other houses.

Our invention further consists in providing a drainpipe, leading from the bottom of the garbage-box to the main sewer in the street, while the portable vessels, or receptacles, being perforated, contain the dry debris, or garbage left therein, ready to be transferred to the garbage-carts, as they pass each day for the purpose of removing the same.

Our invention further consists in providing covers for the said garbage-box, so arranged that they form a part of the walk, or surface of the ground, into which the said garbage-box is buried, thus effectually hiding from view the garbage deposited therein.

To enable others skilled in the art to make and use our invention, we will proceed to describe its construction and operation.

Figure 1 represents the main garbage-box, A, and drain-pipe leading to the main sewer in the street.

Figure 2 represents the portable vessel, or receptacle, C, perforated for draining the garbage.

Figure 3 represents the garbage-box complete, inserted in the ground, with one portable vessel containing garbage partly removed.

Its Construction.

We construct a box, A, fig. 1, of iron or other material, of any required dimensions, say sixty inches long, thirty inches deep, and twenty inches wide, with cover, or covers, D D.

On the top of this box A, we construct one or more holes, E E E, fig. 1, sufficiently large to admit the portable vessel C, fig. 2, which vessel is made to fit the holes E E E, fig. 1, quite loose, so that it may be removed readily and with ease.

This vessel is provided with a small flange, F, fig. 2, at the top, which prevents it from sinking lower than the top of the box A, fig. 1.

This vessel C is also provided with filtering-holes, $g\ g\ g\ g$, fig. 2, for the purpose of filtering the garbage which may be placed therein.

We also provide handles, H H, fig. 2, or their equivalents, to facilitate the removal of the said vessel.

We next cause to be made a pipe, B, fig. 1, and attach the same to the bottom of the box A, which conveys the filtered water and other liquids from the box A to the main street-sewer, I, fig. 1.

This pipe B constitutes the only available public avenue to the main sewer in the street accessible to the public, and so arranged that it cannot be injured or interfered with by any one.

Its Operation.

The garbage-box, being complete in all its parts, is let into the ground, and placed, either at the edge of the walk or otherwise, near a tenement or other house, until the top of the said box is flush, or even with the surface of the ground, the covers D D forming a part of the level surface. We next make the connection with the main sewer in the street, through the agency of the discharge-pipe B, fig. 1, by any of the usual means of pipe-connections, either with iron pipes and lead joints, or terra-cotta pipes, with clay or cement joints, after which the portable vessels C C C, fig. 3, are placed in position, and the covers D D shut down, which completes the whole arrangement.

The tenants deposit the garbage, both wet and dry, in the portable vessels C, fig. 3. The covers D D are next closed, which effectually hides from public view all that the garbage-box contains. The holes $g\ g\ g\ g$, fig. 2, now allow the fluid in the vessels C C C, fig. 3, to filter through the mass of garbage into the lower part of the box A, fig. 3, and enter the pipe B, through which it flows to the main sewer in the street, thus leaving the dry garbage in the vessels C C, to be removed by the city collectors, by raising the portable vessels C C from the box A, fig. 3, and, having emptied the same in their carts, they return the vessels C C to their proper places, close down the covers, and the operation is complete.

By this simple arrangement, we are enabled to offer facilities for the deposition of all the filth and garbage throughout the city, to preserve the purity of the surrounding atmosphere, to convey the obnoxious gases which now taint the air, to the main sewer, and to hide from view the accumulated filth, which at present is exposed to the public gaze.

We do not confine ourselves to the number of portable vessels, nor to the dimensions of the garbage-box, nor to the direction or number of the discharge-pipes; but

What we claim as our invention, and desire to secure by Letters Patent of the United States, is—

The chamber A, provided with a drain-pipe, B, and inner lid, P, having apertures, E, therein, in combination with the perforated removable vessels C, the whole enclosed by hinged covers D, substantially as shown and described.

JAMES W. EVANS.
GEORGE F. GODLEY.

Witnesses:
ROBERT WYATT,
GEORGE P. CLARK.